US006154271A

United States Patent [19]

Duc et al.

[11] Patent Number: 6,154,271

[45] Date of Patent: Nov. 28, 2000

[54] SAFETY SYSTEM FOR A CONTAINER DOOR

[75] Inventors: Didier Duc, Chatenoy le Royal; Matthieu Joseph Helas, Chalon sur Saone, both of France

[73] Assignee: Eastman Kodak Company, Rochester, N.Y.

[21] Appl. No.: 09/229,907

[22] Filed: Jan. 13, 1999

[30] Foreign Application Priority Data

Jan. 28, 1998 [FR] France .................................. 98 01181

[51] Int. Cl.[7] .......................... G03B 27/58; G03B 17/02; G03D 17/00

[52] U.S. Cl. ............................ 355/72; 396/589; 396/536

[58] Field of Search ................................ 355/72; 70/226; 360/97; 396/602, 589, 536, 537

[56] References Cited

U.S. PATENT DOCUMENTS 1,866,086 7/1932 Creery .

FOREIGN PATENT DOCUMENTS

3312064 A1 11/1984 Germany .

59747 11/1991 Germany .

*Primary Examiner*—Russell Adams
*Assistant Examiner*—Peter B. Kim
*Attorney, Agent, or Firm*—David A. Novais

[57] ABSTRACT

A safety system for preventing the exposure of photosensitive sheets wound on at least one core in a container. The container has a door moveable between opened and closed positions, a projection mounted spindle for supporting the at least one core, and a fixing device coupled to the projection mounted spindle for attaching the door to the container. The safety system comprises a member coupled to the door and having an opening, with the member being moveable between at least first and second positions; an indicator coupled to the member, and when visible, indicates to a user that there are photographic sheets wound on the at least one core in the container; and a mechanism for moving the member between the at least first and second positions, so that when the member is in one of the first and second positions, the fixing device is exposed through the opening so that the door can be opened, and when the member is in the other of the first and second positions, the fixing device is covered by the member to prevent the door from being opened and the indicator is visible to indicate to a user that there are photographic sheets in the container.

4 Claims, 2 Drawing Sheets

SAFETY SYSTEM FOR A CONTAINER DOOR

FIELD OF THE INVENTION

The present invention relates to the packaging of photographic products, and in particular, to the packaging of long sheet products wound onto cores.

BACKGROUND OF THE INVENTION

When the delivery of sheet products, such as photographic paper, to processing laboratories is required, it is preferable to use very long sheets, for example 2000 m, to permit efficient use of the photographic printers. Therefore, packaging is used that comprises a light tight enclosure supported on a pallet type base in order for it to be moved by a fork lift truck. This packaging includes at least one projecting spindle onto which the roll to be delivered is put.

When the containers are delivered to the laboratories, they must not be opened in the light given that they contain photosensitive products. Therefore, it is essential to have a safety device to prevent unwanted opening. However, the presence of a safety device causes difficulties for the operator who has to unlock the safety device and then open the container door in the dark.

SUMMARY OF THE INVENTION

Accordingly, it is an object of the present invention to provide a safety system which prevents the opening of a container when photosensitive sheets are inside.

It is another object of the present invention to provide a safety system that warns an operator that photosensitive sheets are inside the container while preventing the container from being opened.

These objects are achieved by a safety system for preventing exposure of photosensitive sheets wound on at least one core in a container, the container having a door moveable between opened and closed positions, a projection mounted spindle for supporting the at least one core, and a fixing device coupled to the projection mounted spindle for attaching the door to the container, the safety system comprising:

(a) a member coupled to the door and having an opening, the member being moveable between at least first and second positions;

(b) an indicator coupled to the member, and when visible, indicates to a user that there are photographic sheets wound on the at least one core in the container; and (c) means for moving the member between the at least first and second positions, so that when the member is in one of the first and second positions, the fixing device is exposed through the opening so that the door can be opened, and when the member is in the other of the first and second position, the fixing device is covered by the member to prevent the door from being opened and the indicator is visible to indicate to a user that there are photographic sheets in the container.

It is an advantage of the present invention to provide a safety system that warns an operator that photosensitive sheets are inside a container while preventing the container from being opened.

It is another advantage of the present invention to provide a safety system that permits an operator who has to open a container containing photosensitive sheets in the dark to open it without any difficulty.

It will be appreciated that the present invention is especially useful for packaging in the form of containers which comprise essentially a base suitable for handling by fork lift truck, a light tight enclosure fitted with a door and a projecting spindle located inside the enclosure intended to take the rolls.

Other features of the invention will appear on reading the description that follows, with reference to the drawings.

DETAILED DESCRIPTION OF THE INVENTION

Figure 1:
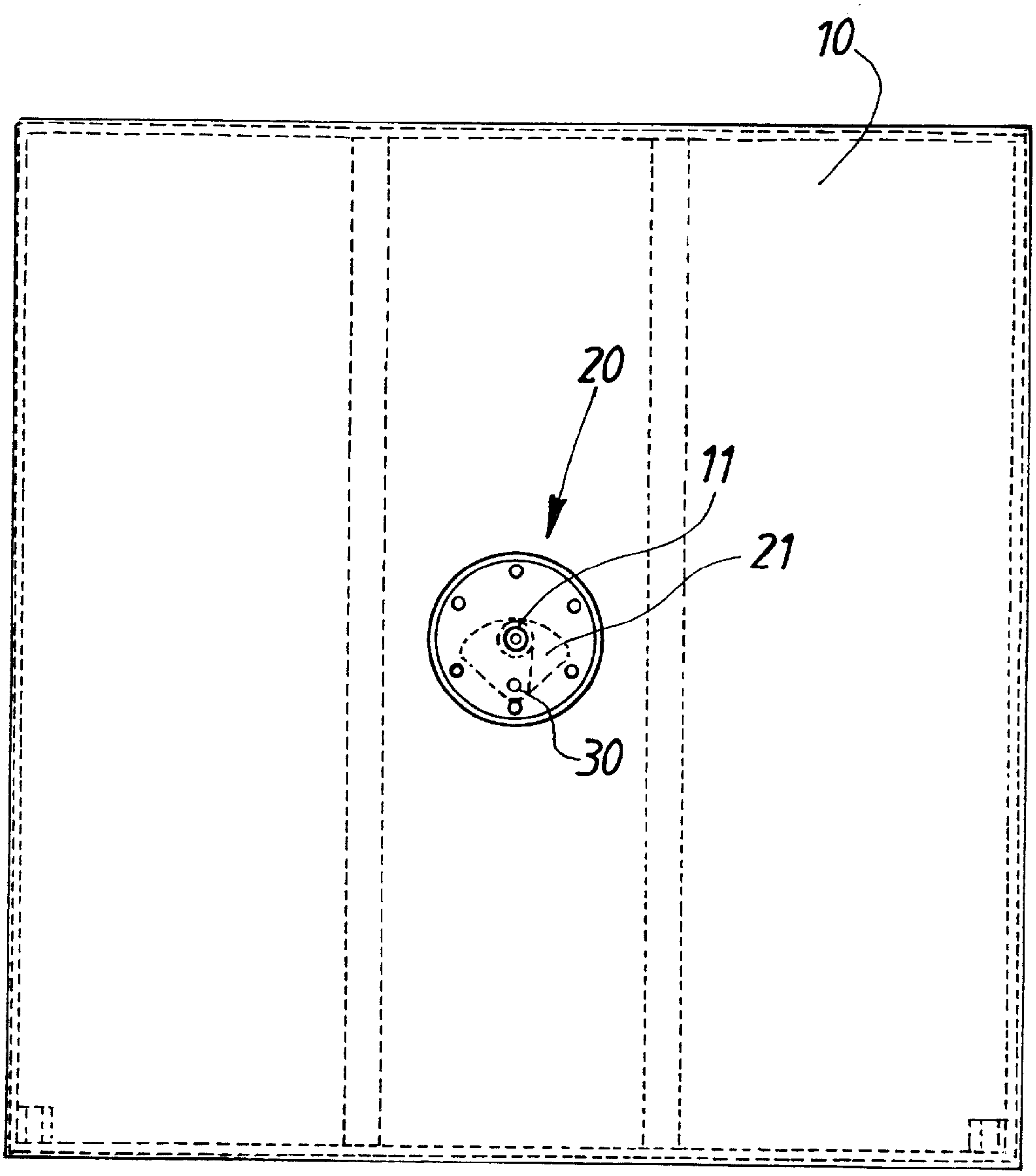
FIG. 1 shows a container door fitted with the safety system according to the present invention.
Figure 2:
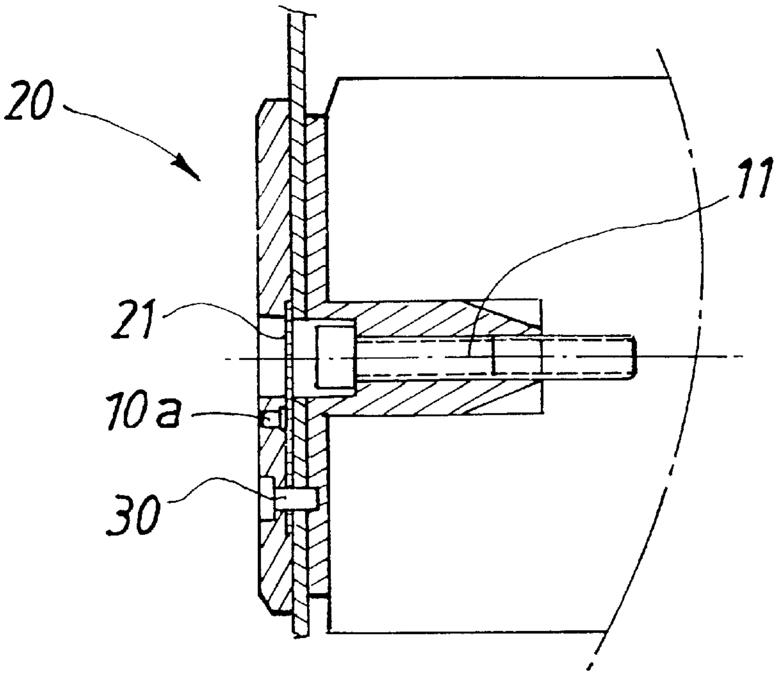
FIG. 2 is a cross-sectional view of the safety system of FIG. 1 according to the present invention.

By referring to FIGS. 1 and 2, a container door 10 fitted with a safety system 20 according to the invention can be seen. The door 10 is attached to a container for sheet products wound onto cores, for example, photographic products. The sheet products wound onto cores are placed in the container onto a projection mounted spindle. The door 10 is attached to the container by means of a fixing device 11, for example, a screw that is attached to the projection mounted spindle. The safety system 20 includes a member 21 that moves between at least a first rest position and a second rest position. The member 21 can have more than two rest positions. The member 21 is positioned on the door 10 at the level of the fixing device 11.

Figure 3:
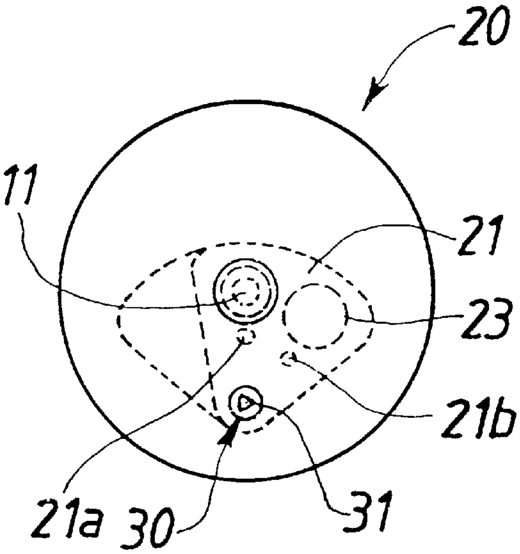
FIG. 3 shows the safety system of FIG. 1 in a first position.
Figure 4:
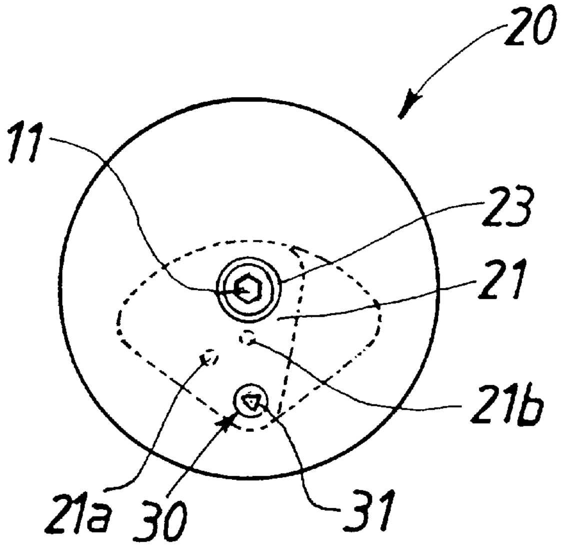
FIG. 4 shows the safety system of FIG. 1 in a second position.

FIGS. 3 and 4 show the safety system 20 according to the invention in the first and second rest positions, respectively.

According to the preferred embodiment of the invention as represented in FIGS. 3 and 4, the member 21 is a flat piece, mounted to the door 10 so as to be able to switch positions around an axis of rotation. The safety system comprises means for moving the member 21 between the two positions, said means comprising a screw 30 which defines an axis of rotation. The screw 30 has a head 31 that can be activated by a special instrument. The head 31 is preferable triangular in shape. The member 21 can therefore take several positions.

The first rest position shown in FIG. 3 corresponds to a position of the moving member 21 where the moving member 21 juts out in front of the fixing device 11 of the container door 10 to block access to fixing device 11. In this position, an indicator coupled to the member 21 indicates to a user that there are photographic sheets wound on at least one core in the container. The visible part of the moving member 21 is, for example, colored red.

A second rest position corresponds to a position of the moving member 21 where the moving member 21 frees access to the fixing device 11. An opening 23 is arranged on the moving member 21 so that, in the second position, the opening 23 overlaps the fixing device 11. This second position is represented in FIG. 4. In this second position, an operator can reach the fixing device 11.

The two rest positions of the moving member 21 are obtained by stabilization means, which are arranged partly, on the moving member 21, and partly, on the door 10, with the whole being designed to work together. The moving member 21 has at least two cavities 21*a* and 21*b*. The door 10 has at least one stud 10*a* designed to work in succession with each cavity 21*a* and 21*b*, thus constituting the stabilization means. The stud 10*a* is small so that its introduction into each cavity is slight while being enough to stabilize the moving member 21 in the chosen position. In this way there is no difficulty for the switching movement of the moving member 21. In order to change position easily, the stud 10*a* is elastic. The movement of the screw 30 by the special instrument is enough for the stud 10*a* to fit into the corresponding cavity 21*a* or 21*b* and leave the cavity 21*a* or 21*b* in such a way that the moving member 21 switches to its second rest position.

When a development laboratory operator receives a container fitted with the safety system 20 according to the present invention, the container being filled with photographic products, the moving member 21 will be in the first rest position in which it blocks access to the fixing device 11 of the container door 10. The operator will clearly see the red color of the moving member 21, which indicates that photosensitive products are inside the container. Therefore, the risk of opening it in the light is practically nil. The operator will only open the container in a dark room. Opening the container will only be possible after switching the moving member 21 to its second rest position in which the fixing device 11 of the container door 10 is accessible. In order to switch the moving member 21, the operator will have an instrument specially designed to work with the screw 30 provided on the moving member 21 which constitutes its axis of rotation. This switching movement can be effected very easily.

The invention has been described in detail with particular reference to certain preferred embodiments thereof, but it will be understood that variations and modifications can be effected within the spirit and scope of the invention.

PARTS LIST

10 door
10*a* stud
11 fixing device
20 safety system
21 moving member
21*a* cavity
21*b* cavity
23 opening
30 screw
31 head

What is claimed is:

1. A safety system for preventing exposure of photosensitive sheets wound on at least one core in a container, the container having a door moveable between opened and closed positions, a projection mounted spindle for supporting the at least one core, and a fixing device coupled to the projection mounted spindle for attaching the door to the container, the safety system comprising:

(a) a member coupled to the door and having an opening, the member being moveable between at least first and second positions;

(b) an indicator coupled to the member, and when visible, indicates to a user that there are photographic sheets wound on the at least one core in the container; and (c) means for moving the member between the at least first and second positions, so that when the member is in one of the first and second positions, the fixing device is exposed through the opening so that the door can be opened, and when the member is in the other of the first and second positions, the fixing device is covered by the member to prevent the door from being opened and the indicator is visible to indicate to a user that there are photographic sheets in the container.

2. A safety system according to claim 1 which further comprises means for stabilizing said member in the at least first and second positions.

3. A safety system according to claim 1 wherein the member has at least first and second cavities and the door has a stud arranged to work in succession together with said at least first and second cavities.

4. A safety system for preventing exposure of photosensitive sheets wound on at least one core in a container, the container having a door moveable between opened and closed positions, a projection mounted spindle for supporting the at least one core, and a fixing device coupled to the projection mounted spindle for attaching the door to the container, the safety system comprising:

(a) a member coupled to the door and having an opening, the member being moveable between at least first and second positions;

(b) an indicator coupled to the member, and when visible, indicates to a user that there are photographic sheets wound on the at least one core in the container; and (c) a screw having an axis of rotation, said screw being adapted to move the member between the at least first and second positions, so that when the member is in one of the first and second positions, the fixing device is exposed through the opening so that the door can be opened, and when the member is in the other of the first and second positions, the fixing device is covered by the member to block access to the fixing device and prevent the door from being opened, and the indicator is visible to indicate to a user that there are photographic sheets in the container.

* * * * *